Oct. 6, 1970  E. ROGOL  3,532,353
TWO-WHEELED FOLDABLE STROLLER
Filed May 20, 1968  2 Sheets-Sheet 1
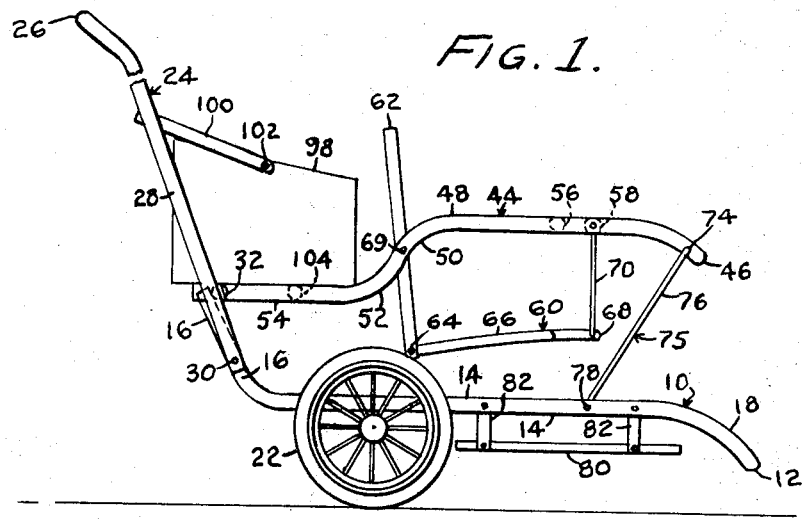
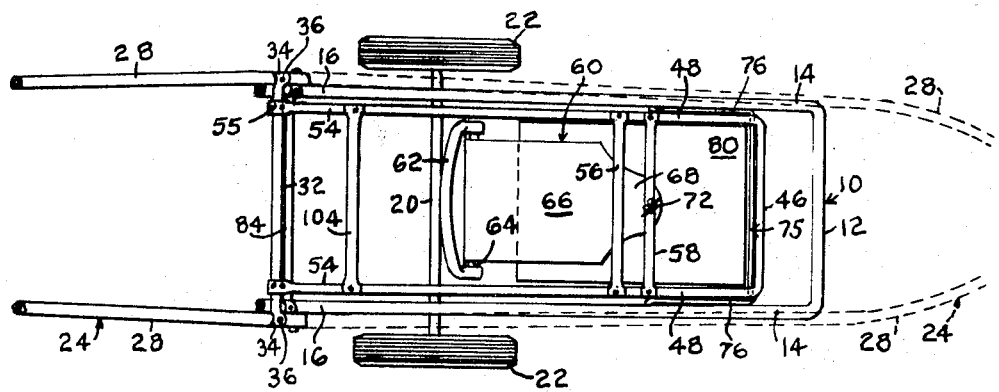
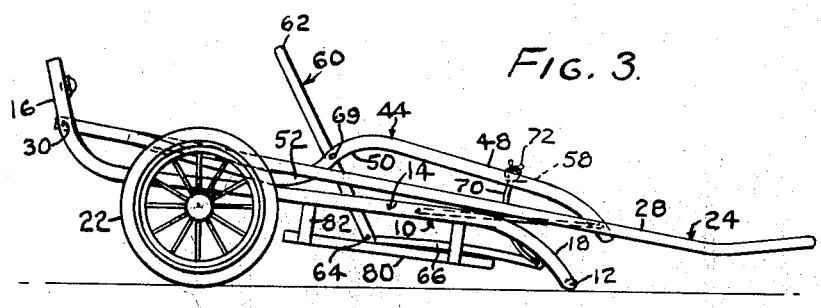
INVENTOR
Edmund Rogol
BY  Alexander B Blair
ATTORNEY Oct. 6, 1970  E. ROGOL  3,532,353

TWO-WHEELED FOLDABLE STROLLER

Filed May 20, 1968  2 Sheets-Sheet 2

INVENTOR
Edmund Rogol

BY *Alexander B. Blair*

ATTORNEY

United States Patent Office 3,532,353
Patented Oct. 6, 1970

3,532,353
TWO-WHEELED FOLDABLE STROLLER
Edmund Rogol, Nimshew Road, Star Rte.,
Magalia, Calif. 95954
Filed May 20, 1968, Ser. No. 730,265
Int. Cl. B62b 11/00
U.S. Cl. 280—36           7 Claims

ABSTRACT OF THE DISCLOSURE

Tubular framing is preferably employed and comprises three main sections, a body, a handle and a seat support, the body being supported by two wheels and the remaining framing sections being foldable to reduce the size of the stroller for storage and transportation.

BACKGROUND OF THE INVENTION

The device relates to the field of strollers for wheeling babies, a number of these devices being foldable but rather complicated and expensive to manufacture. In the average two-wheeled stroller, the baby seat is fixed with respect to the supporting means so that as the vehicle is tilted forwardly or rearwardly on its wheels, the baby seat similarly tilts.

SUMMARY OF THE INVENTION

Three main frame sections are employed, preferably of tubular cross section. The main body of the device forming the lowest frame section thereof carries a transverse axle supported on a pair of wheels. The forward end of the frame curves downwardly to rest on the supporting surface when the stroller is tilted forwardly. A second main frame unit is in the form of a U-shaped handle structure, the loop of which forms a handle proper, while the two legs of the handle structure are pivoted to the rear end of the main body to swing forwardly to folded position. The third main frame section is a seat support, preferably U-shaped, with the free ends welded or otherwise secured to a cross bar pivoted between the forwardly extending arms of the handle section. The rear end of the seat support is thus supported by the handle section, while upwardly extending rods connected at their lower ends to the body are connected at their upper ends to the seat support. A baby seat is suspended within the seat support and is adapted to swing forwardly or rearwardly to maintain approximately a fixed position when the stroller is tilted rearwardly to be rolled on the wheels thereof or when it is tilted forwardly so that the forward end of the body rests on the ground. A foot platform is carried by the main body and upon which the baby my rest its feet.

BRIEF DESCRIPTION OF THE DRAWINGS

FIG. 1 is a side elevation of the stroller with the parts in operative positions showing a basket in position thereon;

FIG. 2 is a plan view, the basket being omitted;

FIG. 3 is a side elevation of the stroller showing the parts thereof folded;

DESCRIPTION OF THE PREFFERED EMBODIMENT

Figure 4:
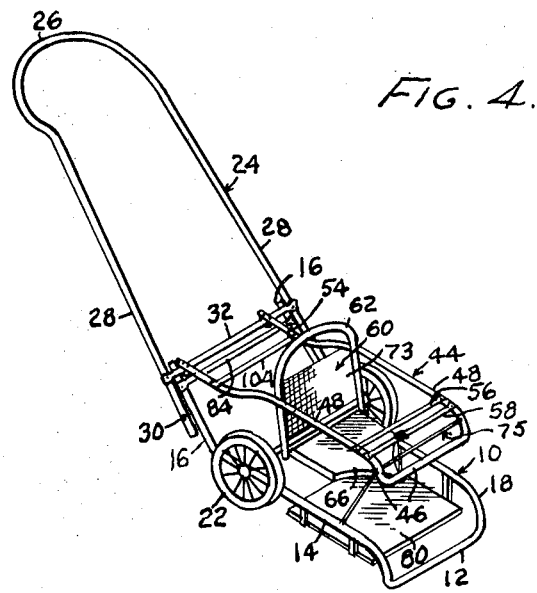
FIG. 4 is a perspective view of the stroller.
Figure 7:
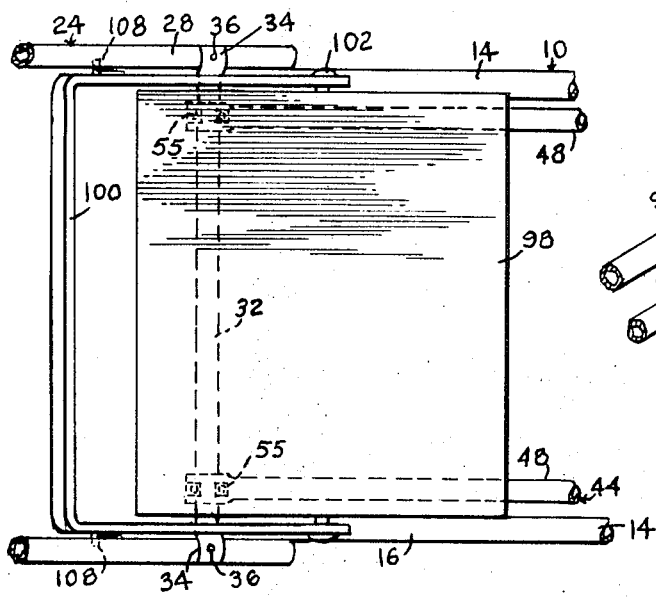
FIG. 7 is an enlarged fragmentary plan view of a portion of the stroller showing the basket in position thereon.

Referring to the drawings, the numeral 10 designates the main body of the stroller as a whole preferably formed of tubing stock such as an aluminum tubing. The body 10 is substantially U-shape in form having the loop 12 at its forward end and side frame members 14 extending rearwardly and turned upwardly at an angle at their rear ends as at 16. The forward end of the body curves downwardly as at 18 so that the cross member 12 is adapted to engage the supporting surface when the stroller is tilted forwardly, as referred to below, or when it is folded as in FIG. 3. The body is provided therebeneath with an axle 20 supporting preferably rubber-tired wheels 22 (FIG. 2) on which the stroller is adapted to be rolled wherever desired.

At the rear end of the stroller there is provided a handle section 24 of U-shape having a loop 26 at the rear upper end thereof constituting the handle proper and side frame members 28, the latter of which are pivoted near their lower ends as at 30 to the upwardly and rearwardly extending adjacent extremities 16 of the body 10.

Between the side members 28 of the handle structure is arranged a cross member 32 (FIGS. 5 and 6) beyond and behind which the ends 16 extend. At each end thereof, cross member 32, which is tubular, is flattened as at 34 and riveted as at 36 to the adjacent handle member 28.

A seat support indicated as a whole by the numeral 44 is also formed of tubular material and is of U-shape to provide a forward cross loop 46 and rearwardly extending arms 48. These arms curve downwardly toward their rear ends as at 50, thence rearwardly as at 52 to terminate in straight ends 54 overlying and connected to the cross member 32 by U-bolts 55. Two cross members 56 and 58 extend between and are welded at their ends to the arms 48 of the seat support.

The support 44 carries therewithin a seat indicated as a whole by the numeral 60 and comprises an inverted U-shaped tubular back 62, the lower ends of which are pivoted as at 64 (FIG. 1) to a seat 66 having a central forwardly extending portion 68 adapted to be straddled by a child on the seat 66. The back 62 is pivoted to the side arms 48 as at 69 so that the back portion of the seat is supported directly by the seat support 44. A nylon or similar rope 70 is tied as at 72 to the cross bar 58 to support the forward end of the seat 66. A canvas or similar back rest 73 extends across the back 62.

The welding of the rear ends of the side arms 48 to the cross member 32 supports the seat support 44 relative to the handle structure 24. Adjacent its forward end, the support 44 is pivotally connected at opposite sides as at 74 to an inverted U-shaped member 75 including rods 76, the lower ends of which are pivoted as at 78 to the side members 14 of the body 10. The rods 76 are inclined upwardly and forwardly in the positions of the parts as shown in FIG. 1.

Beneath the body 10 is arranged a foot rest 80. This element is supported by front and rear bands 82 connected at their upper ends to the side member 14 of the body.

Figure 5:
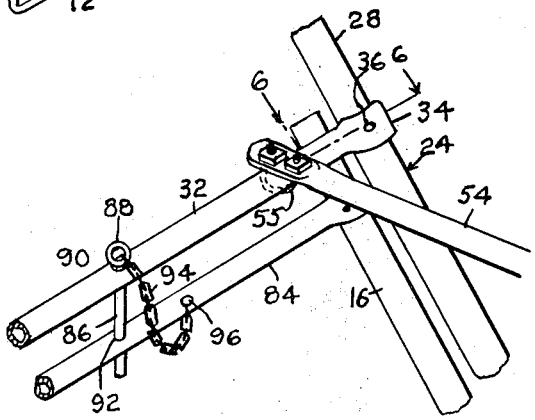
FIG. 5 is a fragmentary perspcetive view to an enlarged scale showing one of the side members of the handle section and associated parts.
Figure 6:
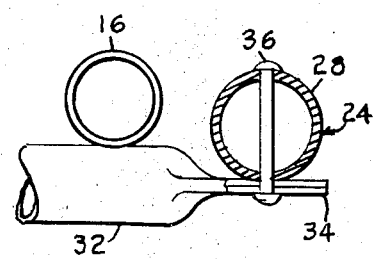
FIG. 6 is a section on line 6—6 of FIG. 5.

Referring to FIG. 5, it will be noted that the rear upper ends 16 of the body are connected by tubular cross member 84. This member lies parallel to and in close proximity to the cross member 32. A locking pin 86 is adapted to hold the cross members 32 and 84 against relative movement when the parts of the stroller are in operative positions. The pin 86 is provided at its upper end with an eye 88 and the pin is adapted to extend through openings 90 and 92 in the cross members 32 and 84, respectively.

To prevent the loss of pin 86, a chain 94 is connected at one end to the eye 88 and is connected at its other end as at 96 to the cross member 84.

When the parts are in operative positions, the space between the seat back 62 and handle structure 24 (FIG. 1) may be utilized to carry a basket 98 having the U-shape handle 100 pivoted to opposite sides of the basket as at 102. The rear end of the basket rests on the cross member 32, and as a support for the forward end of the basket, a cross member 104 may be connected between the side arms 48. To securely fix the basket against dislodgement, the handle 100, which is preferably of metal, is provided with a locking element 106 welded to each arm of the handle and provided at its rear end with a locking finger 108 adapted to engage in an opening 110 in the associated side arm 28 of the handle structure.

OPERATION

The parts normally occupy the positions shown in FIGS. 1 and 4, the locking pin 86 extending through the openings 90 and 92 to prevent the stroller from swinging forward. With the cross member 12 of the body 10 resting on the ground, the user will preferably place her foot on the cross member 12 and then place the child in position on the seat 66 straddling the forward end 68 thereof and the child's feet may rest on the foot support 80. The child's weight will be slightly forwardly of the wheels 22 and accordingly the stroller will not tip over backwardly. The user then grasps the handle 26, moving it downwardly to rock the cross member 12 upwardly out of engagement with the surrounding surface, thrust being transmitted to the frame 14 by engagement of the bar 32 with the rear frame ends 16. The stroller then may be pushed wherever desired.

Figure 8:
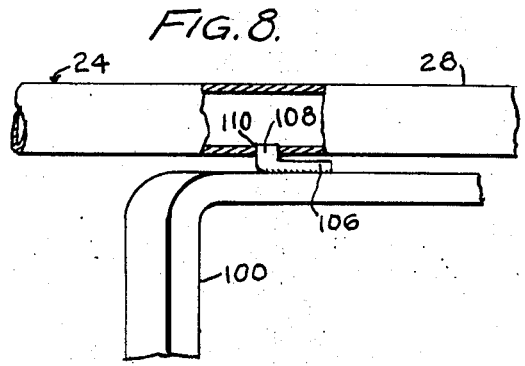
FIG. 8 is a detailed view, partly in section, showing the means for connecting the basket handle to the handle section of the stroller.

The basket 98 is a handy appurtenance to the stroller which is so constructed as to provide a space or recess in which the basket may be arranged. The basket will rest on the cross members 32 and 104 and will be fixed against dislodgement by the locking means shown in FIG. 8. To engage such locking means, the side arms of the basket handle 100 may be slightly flexed inwardly to permit the fingers 108 to engage in the openings 110. The basket may be similarly removed by flexing the arms of the handle 100 inwardly to release the fingers 108. The stroller may be wheeled to a store, or the child may be carried into the store together with the basket 98 and articles purchased in the store may be placed in the basket. This basket of course, will be replaced and the child placed in the seat after the shopping tour has been completed. The basket is removed before the child to prevent the stroller from tipping backwardly. The weight of the child counterbalances the weight of the basket.

When the stroller is to be stored or transported, it will be folded. The pin 86 will be removed and dropped, and its loss will be prevented by the chain 94. The locking pin having been removed, the handle unit may be swung forwardly and will pivot relative to the body 10 at the pivoting points 30. The handle structure 24 will then assume the position shown in FIG. 3, lying upon the side members of the body 10. The forward swinging movement of the handle structure imparts similar movement to the seat support 44, the latter also assuming the position shown in FIG. 3. This movement swings the upper end of the seat back 62 about the pivot points 68 and the lower end of the seat back will then rest on the foot support 80. The nylon rope 72 will be slacked as shown in FIG. 3, and the seat 66 will rest upon the foot support 80. The pin 86 having been removed, it will be apparent that the folding operation requires only one movement on the part of the operator, namely, the forward swinging of the handle structure 24. The basket 98, of course, will have been removed. Obviously, when the parts are folded, the stroller requires much less space, as will be apparent from a comparison of FIGS. 1 and 3.

It will be noted that the pivot points 58, 69, 64 and 68 form, in effect, a parallelogram suspension means for the seat 66. Therefore, whether the stroller is tilted downwardly and forwardly or downwardly and rearwardly, the seat 66 occupies approximately the same relative position without tilting the child forwardly or rearwardly. The rubber-tired wheels 22 are of such size that the stroller readily may be rolled over relatively rough terrain without discomfort to a child in the stroller.

From the foregoing it will now be seen that there is herein provided an improved Two-Wheeled Foldable Stroller whch accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. A stroller comprising a generally horizontal body having forward and rear ends and a pair of wheels thereneath at opposite sides thereof, a handle structure extending upwardly and rearwardly and pivotally connected at its lower end to the rear end of said body, a seat support spaced above said body and having pivotal connection at its rear end to said handle structure, pivot mean connecting the forward end of said seat support to said body, and a seat carried by said seat support, the pivotal connection of said seat support with said handle structure being arranged above the pivotal connection of said handle structure with said body, whereby, when said handle structure is pushed forwardly it will pivot relative to said body and swing downwardly thereover and will move said seat support forwardly and downwardly therewith, said seat support being of rearwardly opening generally U-shape and between the sides of which said seat is arranged, said seat including a back pivoted to the sides of said seat support, a seat element pivoted at its rear end to the lower end of said back, and suspension means connecting the forward end of said seat element to said seat support.

2. A stroller according to claim 1 wherein said suspension means has swinging connection at its upper and lower ends with said seat support and said seat element, whereby said seat element is adapted to swing forwardly and rearwardly as said body is tilted about the axis of said wheels.

3. A stroller according to claim 1 wherein said back of said seat is spaced forwardly of said handle structure, cross members extending between the sides of said seat support, a basket arranged on said cross members and having a pivoted handle, and means for detachably connecting said basket handle to said handle structure.

4. A stroller according to claim 3 wherein said handle structure is of inverted U shape providing side arms between which said handle of said basket is adapted to move, said side arms of said handle structure being provided with openings, said means for detachably connecting said basket handle to said handle structure comprising locking fingers carried by said handle of said basket at opposite sides thereof and engageable in said openings upon the flexing apart of the side arms of said handle structure.

5. A stroller comprising a generally horizontal body having forward and rear ends and a pair of wheels thereneath at opposite sides thereof, a handle structure extending upwardly and rearwardly and pivotally connected at its lower end to the rear end of said body, a seat support spaced above said body and having pivotal connection at its rear end to said handle structure, pivot means connecting the forward end of said seat support to said body, a seat carried by said seat support, the pivotal connection of said seat support with said handle structure being arranged above the pivotal connection of said handle structure with said body, whereby, when said handle structure is pushed forwardly it will pivot relative to said body and swing downwardly thereover and will move said seat support forwardly and downwardly therewith, said body being of rearwardly opening U-shape, having its forward end turned downwardly to form means adapted to contact the surrounding surface to limit forward tilting movement of the stroller, the rear ends of the sides of said body being turned upwardly and pivotally connected to said handle structure, said handle structure being of inverted U-shape having spaced arms respectively pivotally connected to the adjacent rear ends of the sides of said body, and a crossbar between the sides of said handle structure and connected thereto, the rear ends of said arms of said seat support being pivoted to said crossbar.

6. A stroller according to claim 5 wherein the rear ends of said body extend upwardly behind said crossbar whereby rearward and downward movement of said handle structure tilts the rear end of said body downwardly and the forward end upwardly.

7. A stroller according to claim 7 provided with a crossbar connected between the rear ends of said body and lying adjacent said cross member, and a locking pin insertible through said cross member and said crossbar to prevent swinging movement of said handle structure relative to said body.

References Cited

UNITED STATES PATENTS

| 1,057,314 | 3/1913 | Adams | 280—39 |
| 1,184,364 | 5/1916 | Loshbough | 280—39 |
| 1,200,563 | 10/1916 | Wiser | 280—39 |
| 1,301,514 | 4/1919 | Shaw | 280—47.25 |
| 2,728,580 | 12/1955 | Preisler | 280—36 |
| 2,886,337 | 5/1959 | Quisenberry | 280—36 |
| 3,063,729 | 11/1962 | Hamilton | 280—36 |

FOREIGN PATENTS 256,789  8/1925  Great Britain.

BANJAMIN HERSH, Primary Examiner

R. R. SONG, Assistant Examiner